United States Patent
Liu et al.

(10) Patent No.: US 10,235,337 B2
(45) Date of Patent: Mar. 19, 2019

(54) DISTRIBUTED WORK FLOW USING DATABASE REPLICATION

(71) Applicant: EMC Corporation, Hopkinton, MA (US)

(72) Inventors: Hui Liu, Westborough, MA (US); Hui Li, Bellevue, WA (US); Grace Chen, Beijing (CN); Yun Qin, Westborough, MA (US); Boying Lu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 592 days.

(21) Appl. No.: 14/748,478

(22) Filed: Jun. 24, 2015

(65) Prior Publication Data
US 2016/0378785 A1    Dec. 29, 2016

(51) Int. Cl.
G06F 17/30      (2006.01)
G06F 16/27      (2019.01)

(52) U.S. Cl.
CPC .................................. *G06F 16/27* (2019.01)

(58) Field of Classification Search
CPC ......... G06F 17/30575; G06F 17/30581; G06F 17/30595
See application file for complete search history.

(56) References Cited

U.S. PATENT DOCUMENTS

| | | | | |
|---|---|---|---|---|
| 5,999,911 A | * | 12/1999 | Berg | G06F 17/50 705/7.13 |
| 2007/0156485 A1 | * | 7/2007 | Sanabria | G06Q 10/06 705/7.26 |
| 2016/0217005 A1 | * | 7/2016 | Ding | G06F 9/4881 |

OTHER PUBLICATIONS

Highleyman et al, "What is Active/Active?", 2006, Sombers Associates, Inc., 5 pages.*

* cited by examiner

*Primary Examiner* — Loc Tran
(74) *Attorney, Agent, or Firm* — Daly, Crowley, Mofford & Durkee, LLP

(57) ABSTRACT

A method includes determining if a workflow step has an unsatisfied dependency; setting a state of the workflow step to a blocked state if the workflow step has an unsatisfied dependency; executing the workflow step if the workflow step does not have an unsatisfied dependency; setting the state of the workflow step to a cancelled state if, after executing the workflow step; the workflow step is cancelled; setting the state of the workflow step to a success state if, after executing the workflow step, the workflow step is executed successfully; setting the state of the workflow step to an error state if, after executing the workflow step, the workflow step is executed unsuccessfully; setting a state of a workflow to a success state if the workflow is executed successfully; and notifying other nodes of the state of the workflow step and the state of the workflow using a database replication.

20 Claims, 6 Drawing Sheets

DISTRIBUTED WORK FLOW USING DATABASE REPLICATION

BACKGROUND

A distributed workflow includes a sequence of steps which are executed on different nodes in a distributed system. The nodes may reside in same data center, or in multiple data centers. FIG. 1 is an example of a distributed workflow. Some steps of the workflow are expected to be executed on node 1, other steps are expected to be executed on either node 2 or node 3. The nodes 1, 2, 3 may be in local data center, or distributed among multiple data centers.

SUMMARY

In one aspect, a method includes determining, at a node, if a workflow step has an unsatisfied dependency, setting, at the node, a state of the workflow step to a blocked state if the workflow step has an unsatisfied dependency, executing the workflow step if the workflow step does not have an unsatisfied dependency, setting, at the node, the state of the workflow step to a cancelled state if, after executing the workflow step, the workflow step is cancelled, setting, at the node, the state of the workflow step to a success state if, after executing the workflow step, the workflow step is executed successfully, setting, at the node, the state of the workflow step to an error state if, after executing the workflow step, the workflow step is executed unsuccessfully, setting, at the node, a state of a workflow to a success state if the workflow is executed successfully; and notifying other nodes of the state of the workflow step and the state of the workflow using a database replication.

In another aspect, an apparatus includes electronic hardware circuitry configured to determine, at a node, if a workflow step has an unsatisfied dependency; set, at the node, a state of the workflow step to a blocked state if the workflow step has an unsatisfied dependency; execute the workflow step if the workflow step does not have an unsatisfied dependency; set, at the node, the state of the workflow step to a cancelled state if, after executing the workflow step, the workflow step is cancelled; set, at the node, the state of the workflow step to a success state if, after executing the workflow step, the workflow step is executed successfully; set, at the node, the state of the workflow step to an error state if, after executing the workflow step, the workflow step is executed unsuccessfully; set, at the node, a state of a workflow to a success state if the workflow is executed successfully; and notify other nodes of the state of the workflow step and the state of the workflow using a database replication.

In a further aspect, an article includes a non-transitory computer-readable medium that stores computer-executable instructions, the instructions causing a machine to determine, at a node, if a workflow step has an unsatisfied dependency; set, at the node, a state of the workflow step to a blocked state if the workflow step has an unsatisfied dependency; execute the workflow step if the workflow step does not have an unsatisfied dependency; set, at the node, the state of the workflow step to a cancelled state if, after executing the workflow step, the workflow step is cancelled; set, at the node, the state of the workflow step to a success state if, after executing the workflow step, the workflow step is executed successfully; set, at the node, the state of the workflow step to an error state if, after executing the workflow step, the workflow step is executed unsuccessfully; set, at the node, a state of a workflow to a success state if the workflow is executed successfully; and notify other nodes of the state of the workflow step and the state of the workflow using a database replication.

DETAILED DESCRIPTION

Described herein are techniques to provide distributed workflow coordination through a database replication (e.g., an active/active database replication).

Figure 1:
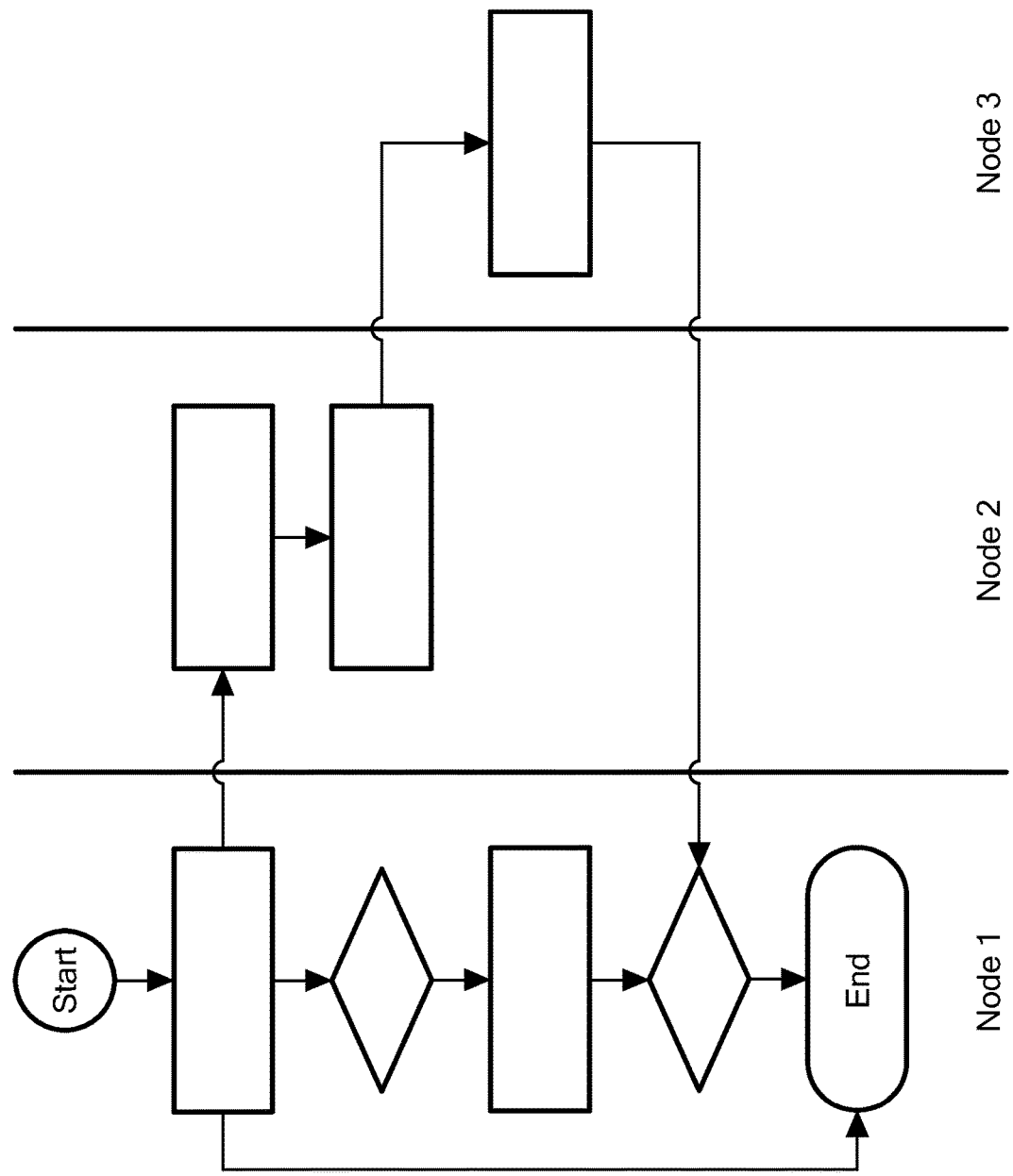
FIG. 1 is a block diagram of a workflow distributed over nodes.
Figure 2:
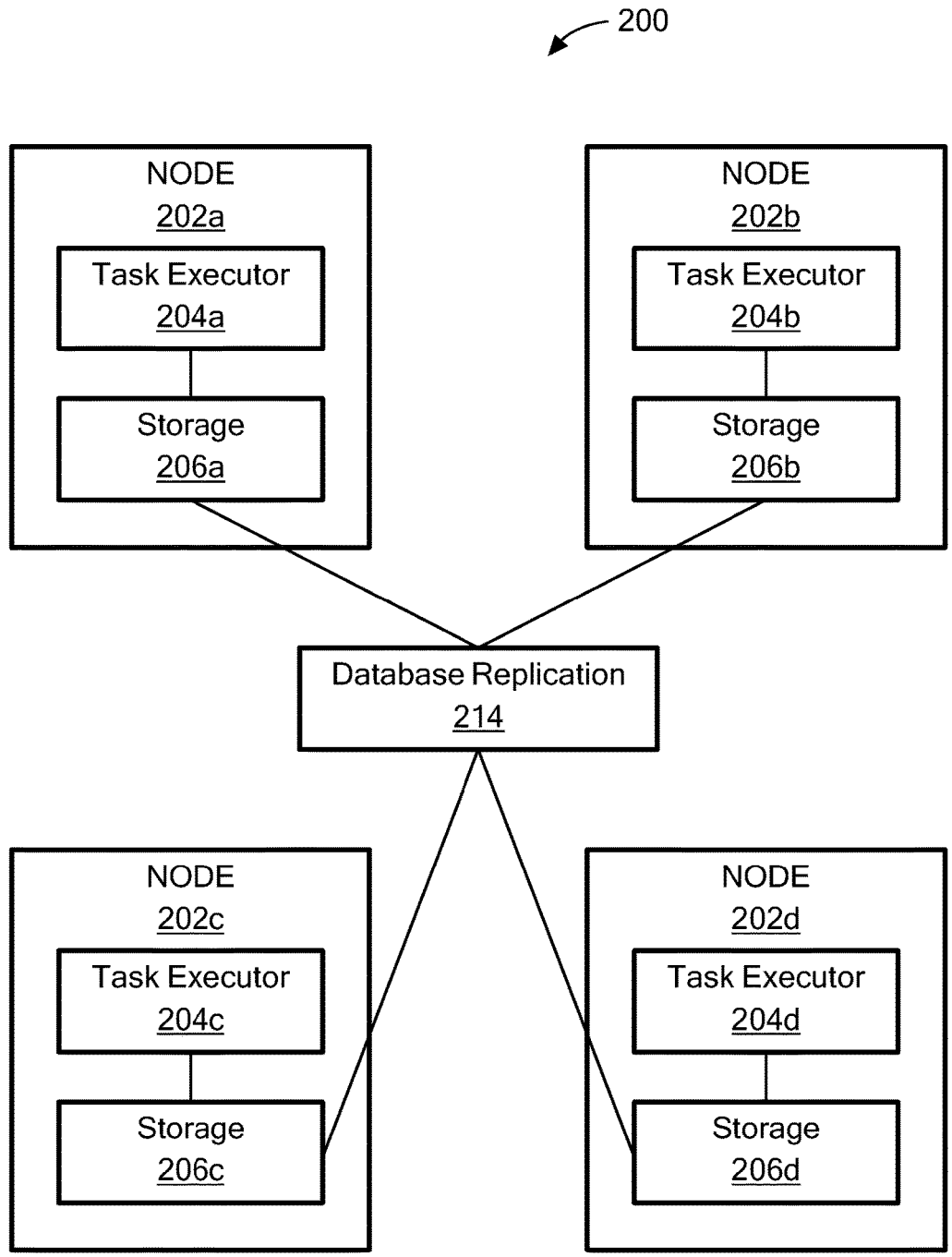
FIG. 2 is a block diagram of an example of a workflow coordination system.

Referring to FIG. 2, a workflow coordination system 200 is an example of a system that executes a workflow over distributed nodes at the same site (e.g., in the same data center). The workflow coordination system 200 includes nodes (e.g., a node 202a, a node 202b, a node 202c and a node 202d) and a database replication 214. The nodes 202a-202d include a task executor 204a-204d, respectively and a storage 206a-206d, respectively. The task executor (e.g., task executor 204a-204d) executes one or more workflow steps of the workflow.

The storage (e.g., storage 206a-206d) stores a workflow definition and status (as indicated by its state). A workflow is defined before the workflow coordination system 200 executes the workflow. The workflow definition/status is serialized to the database replication 214. A complete workflow definition includes a Workflow data structure (object) and a group of Workflow Step data structure (objects). In one example, a Workflow data structure includes the following fields: uniform resource identifier (URI) ID (unique database ID); String orchControllerName (name of the workflow); String task ID; String state (indicating if the workflow succeeds or not); Boolean completed. In one example, a Workflow Step data structure includes the following fields: URI ID (unique database ID for this step); URI workflow ID; URI dependency; String execution Method; string rollback method (a pointer to method to be executed when the workflow fails); string state; date start time; and date end time.

The database replication 214 is an active/active database replication that allows nodes to share workflow metadata and status. The database replication 214 includes the following features.

First, since any node can initiate a write request, the database replication 214 returns a success state after the write is successfully done on a quorum of nodes. "Quorum" means a majority of the nodes of a cluster. For example, in FIG. 2, a cluster includes the nodes 202a-202d and a quorum is met when the write succeeds on any 3 of the nodes.

Second, for any read request, database replication 214 tries to read quorum nodes and return success after merging result from a quorum of the nodes. Third, minority node failure does not affect availability of the whole system 200.

Fourth, each node owns a database copy. The database replication 214 is functional if a majority of nodes are up/running.

In one particular example, the database replication 214 is APACHE CASSANDRA integrated with APACHE ZOO-KEEPER.

Figure 3:
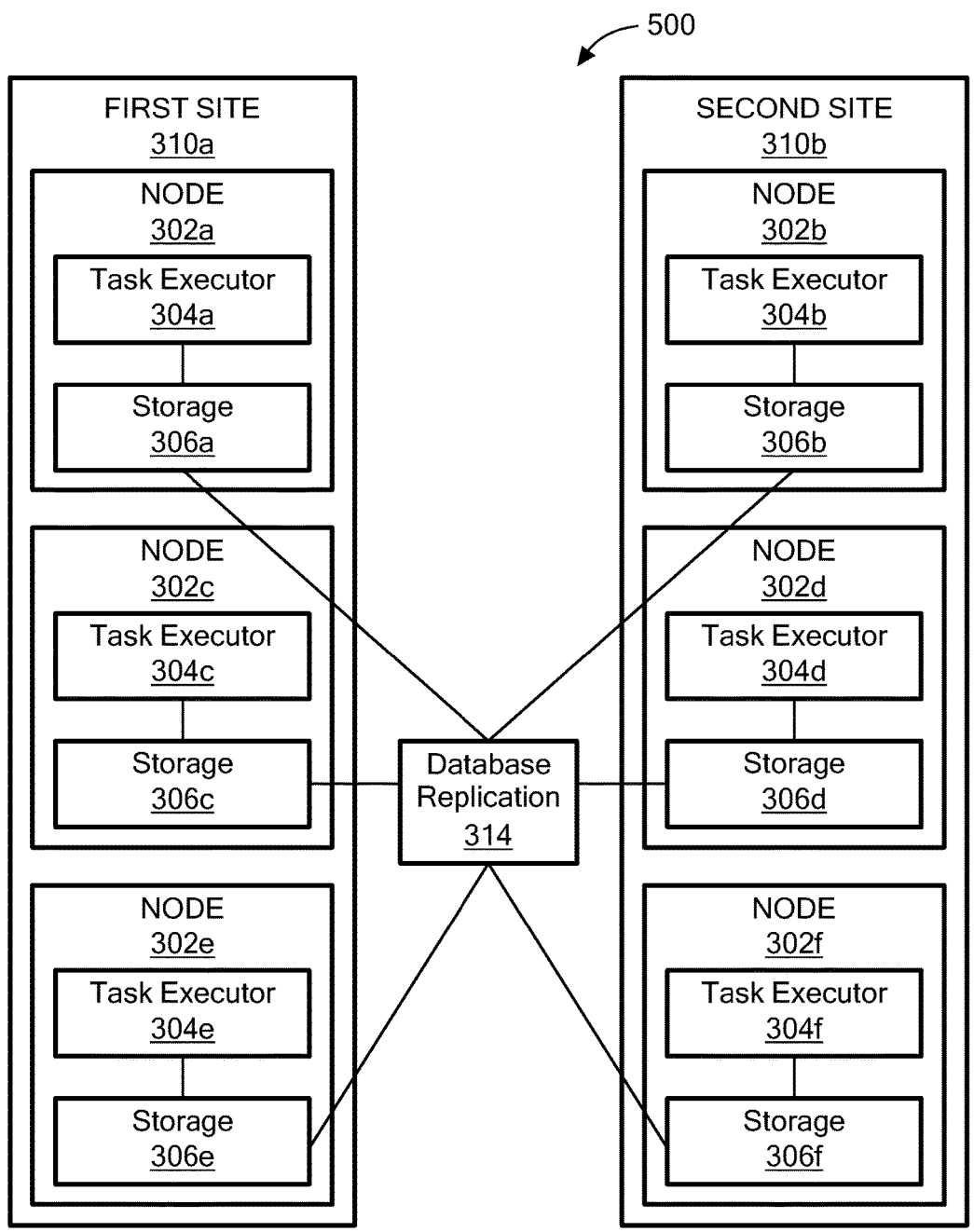
FIG. 3 is a block diagram of an example of another workflow coordination system.

Referring to FIG. 3, a workflow coordination system 300 is an example of a system that executes a workflow over distributed nodes over different sites (e.g., using different data centers). The workflow coordination system 300 includes nodes (e.g., a node 302a, a node 302b, a node 302c, a node 302d, a node 302e and a node 302f) and a database replication 314. The nodes 302a-302f includes a task executor 304a-304f, respectively and a storage 306a-306f, respectively. The nodes 302a, 302c, 302e are at a first site 310a and the nodes 302b, 302d, 302f are at a second site 310b. The database replication 314 is substantially the same as the database replication 214.

Figure 4:
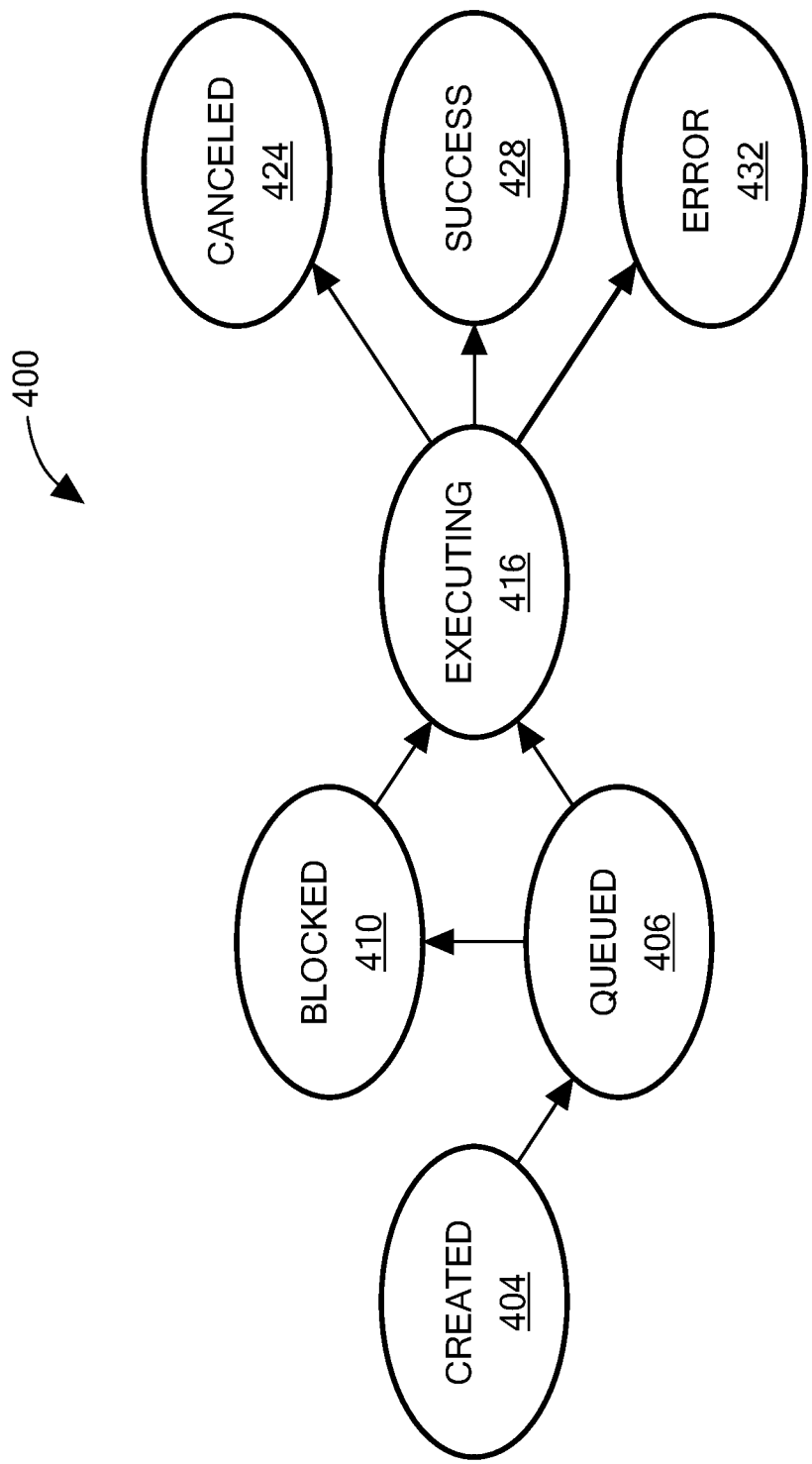
FIG. 4 is a block diagram of a state flow diagram for a workflow.

Referring to FIG. 4, a state flow diagram 400 depicts the states that a workflow or workflow step may be in. A workflow or a workflow step could be in one of the following states. The Created state 404 indicates that the workflow/workflow step is defined and added to database. The Queued state 406 indicates that that the task executor has no resource to run the workflow/workflow step and is pending in queue. The Blocked state 410 indicates that the task executor has a resource to execute the workflow/workflow step, but the task executor is blocked by some external dependency. The Executing state 416 indicates that a task executor is executing the workflow/workflow step. The Cancelled state 424 indicates that the workflow/workflow step was cancelled by end-user when the workflow/workflow step is executing. The Success state 428 indicates that the workflow/workflow step is successfully finished. The Error state 432 indicates that the workflow/workflow step execution failed.

Figure 5:
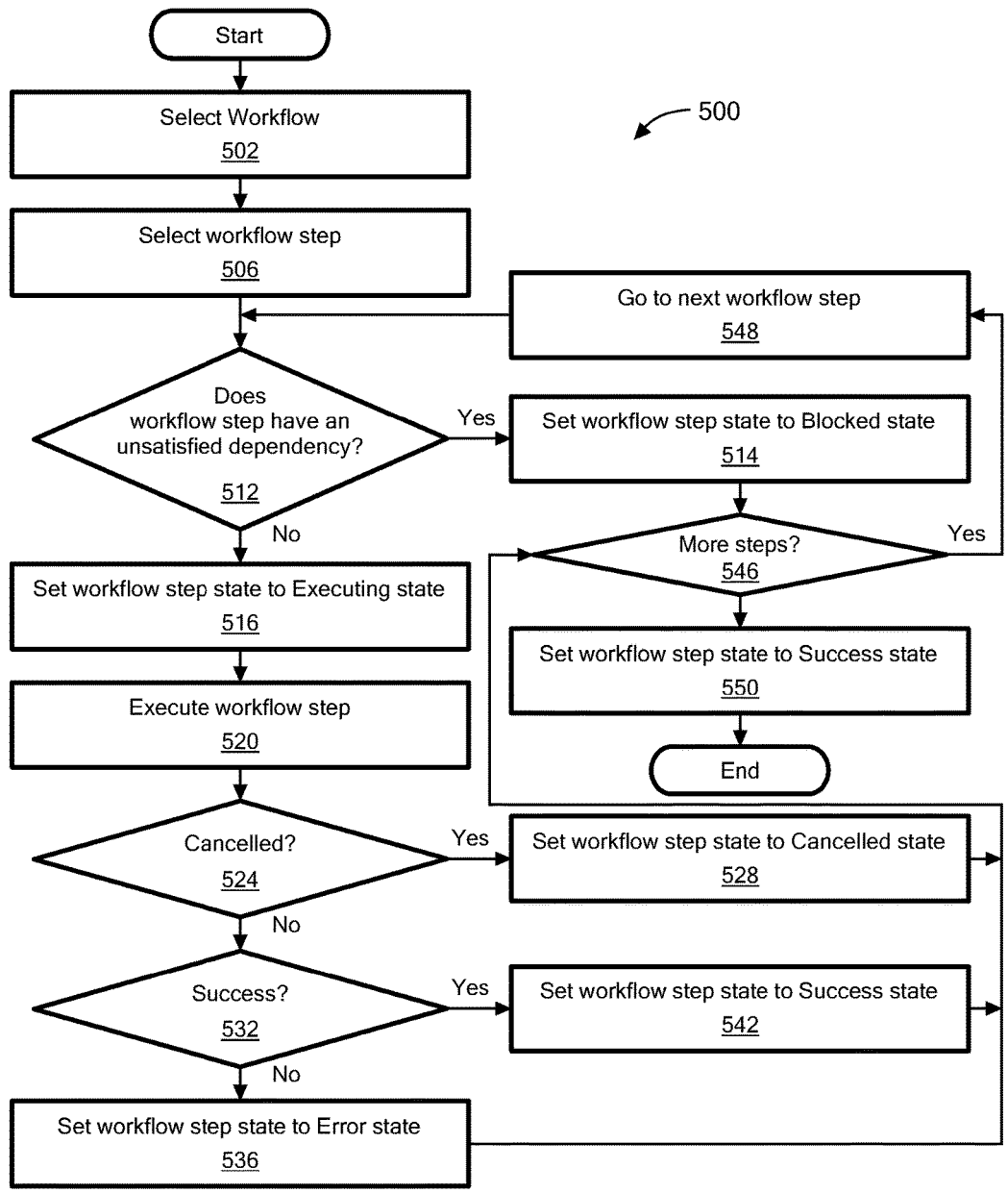
FIG. 5 is a flowchart of an example of a process to execute a workflow used by a distributed node.

Referring to FIG. 5, a process 500 is an example of a process performed by nodes to process a workflow. Prior to executing the process 500 by each node, the workflow is defined based on workflow data structure and the workflow step data structures. After the workflow data structure and workflow step data structures are pushed to one node, the workflow data structure and the workflow step data structures are replicated to all nodes in the workflow coordination system using the database replication. The replication method could be synchronous or asynchronous.

Process 500 selects a workflow (502) and selects a workflow step (506) from the workflow selected. Process 500 determines whether the workflow step has an unsatisfied dependency (512). If the workflow step has an unsatisfied dependency, process 500 sets the workflow step to a Blocked state (514). The replication database 214 updates the other nodes. If the workflow step has no unsatisfied dependencies, process 500 sets the workflow step to Executing step (516). The replication database 214 updates the other nodes.

Process 500 executes the workflow step (520). Process 500 determines if the workflow step has been cancelled by the user (524) and if the workflow step has been cancelled by the user, process 500 sets the state of the workflow step to Cancelled (528). The replication database 214 updates the other nodes.

If the workflow step has not been cancelled by the user, process 500 determines if the execution of the workflow step was successful and if the execution of the workflow step was not successful, process 500 sets the workflow step state to Error (536). The replication database 214 updates the other nodes.

If the execution of the workflow step was successful, process 500 sets the workflow step state to Success state (542). The replication database 214 updates the other nodes.

After processing blocks 514, 536 and 542, process 500 determines if there are additional steps (546) and if there are additional steps process 500 goes to the next workflow step (548).

If there are no additional steps, process 500 sets the workflow state to Success state (550). The replication database 214 updates the other nodes.

Figure 6:
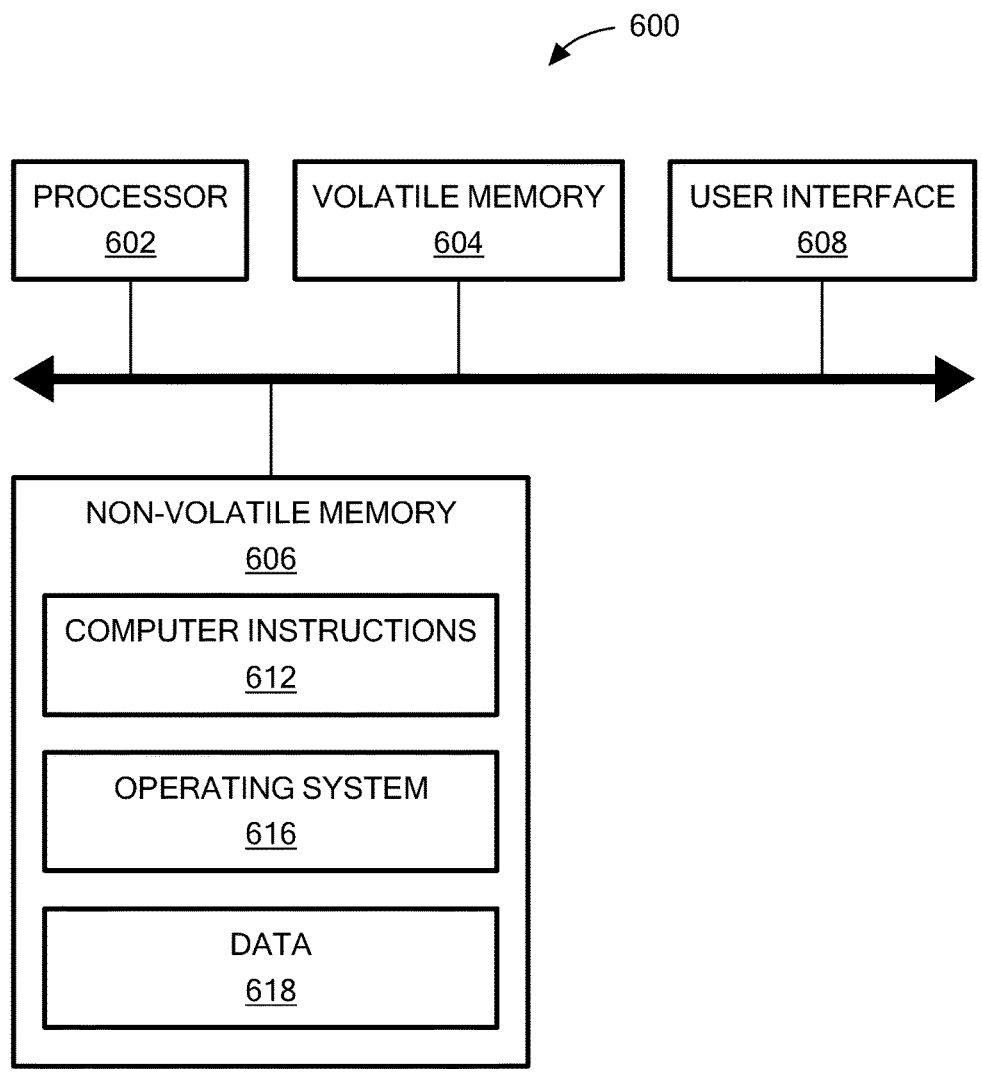
FIG. 6 is a computer on which any of the portions of the process of FIG. 5 may be implemented.

Referring to FIG. 6, a computer 600 includes a processor 602, a volatile memory 604, a non-volatile memory 606 (e.g., hard disk) and the user interface (UI) 608 (e.g., a graphical user interface, a mouse, a keyboard, a display, touch screen and so forth). The non-volatile memory 606 stores computer instructions 612, an operating system 616 and data 618. In one example, the computer instructions 612 are executed by the processor 602 out of volatile memory 604 to perform all or part of the processes described herein (e.g., process 500).

The processes described herein (e.g., process 500) are not limited to use with the hardware and software of FIG. 6; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the process 500 is not limited to the specific processing order of FIG. 5. Rather, any of the processing blocks of FIG. 5 may be re-ordered, combined or removed, performed in parallel or in serial, as necessary, to achieve the results set forth above.

The processing blocks (for example, in the process 500) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A computer-implemented method comprising:
    distributing a workflow over a plurality of nodes in a workflow coordination system, each node being in operable communication with a processor and a memory that are configured to enable the node to perform its respective portion of the workflow;
    determining, at each respective node, if a workflow step has an unsatisfied dependency;
    setting, at the respective node, a state of the workflow step to a blocked state if the workflow step has an unsatisfied dependency;
    executing the workflow step at the respective node if the workflow step does not have an unsatisfied dependency;
    setting, at the respective node, the state of the workflow step to a cancelled state if, after executing the workflow step, the workflow step is cancelled;
    setting, at the respective node, the state of the workflow step to a success state if, after executing the workflow step, the workflow step is executed successfully;
    setting, at the respective node, the state of the workflow step to an error state if, after executing the workflow step, the workflow step is executed unsuccessfully;
    setting, at the respective node, a state of a workflow to a success state if the workflow is executed successfully; and
    notifying the other respective nodes of the state of the workflow step and the state of the workflow, each time the workflow step state is set and each time the workflow state is set, using a database replication configured to update the other nodes as to the state of the workflow step and the state of the workflow, to enable each respective node to share workflow metadata and workflow status;
    wherein the state of the workflow step is deemed to be successful in the database replication if a majority of the plurality of respective nodes execute the workflow step successfully, and wherein availability of the workflow coordination system is not affected by a failure of a minority of the plurality of respective nodes to execute the workflow step successfully.

2. The method of claim 1, further comprising selecting the workflow having the state set to create status.

3. The method of claim 1, wherein notifying the other respective nodes of the state of the workflow step and the state of the workflow using the replication database comprises notifying the other respective nodes of the state of the workflow step and the state of the workflow using an active-active replication database.

4. The method of claim 1, further comprising storing at each respective node a workflow data structure comprising the status of the workflow and a workflow step data structure comprising the status of the workflow step.

5. The method of claim 4, wherein storing at the respective node the workflow data structure comprises storing at the node a workflow data structure further comprising at least one of uniform resource identifier (URI) ID field, a name of the workflow field, a string task ID field and a Boolean completed field, and
    wherein storing the workflow step data structure comprises storing a workflow step data structure further comprising at least one of a URI ID field; URI workflow ID field; URI dependency field; a string execution method field; a date start time field or a date end time field.

6. The method of claim 1, further comprising:
    providing a workflow data structure and workflow data step data structure to a respective one of the plurality of nodes; and
    replicating the workflow data structure and replicating the workflow step data structure to the other respective other nodes using the database replication.

7. An apparatus, comprising:
    electronic hardware circuitry configured to:
        distribute a workflow over a plurality of nodes in a workflow coordination system, each node being in operable communication with a processor and a memory that are configured to enable the node to perform its respective portion of the workflow;
        determine, at each respective node, if a workflow step has an unsatisfied dependency;
        set, at the respective node, a state of the workflow step to a blocked state if the workflow step has an unsatisfied dependency;
        execute the workflow step at the respective node if the workflow step does not have an unsatisfied dependency;
        set, at the respective node, the state of the workflow step to a cancelled state if, after executing the workflow step, the workflow step is cancelled;
        set, at the respective node, the state of the workflow step to a success state if, after executing the workflow step, the workflow step is executed successfully;
        set, at the respective node, the state of the workflow step to an error state if, after executing the workflow step, the workflow step is executed unsuccessfully;
        set, at the respective node, a state of a workflow to a success state if the workflow is executed successfully; and
        notify the other respective nodes of the state of the workflow step and the state of the workflow, each time the workflow step state is set and each time the workflow state is set, using a database replication configured to update the other nodes as to the state of the workflow step and the state of the workflow, to enable each respective node to share workflow metadata and workflow status;

wherein the state of the workflow step is deemed to be successful in the database replication if a majority of the plurality of respective nodes execute the workflow step successfully, and wherein availability of the workflow coordination system is not affected by a failure of a minority of the plurality of respective nodes to execute the workflow step successfully.

8. The apparatus of claim 7, wherein the circuitry is further configured to select the workflow having the state set to create status.

9. The apparatus of claim 7, wherein the circuitry configured to notify the other respective nodes of the state of the workflow step and the state of the workflow using the database replication database comprises circuitry configured to notify the other respective nodes of the state of the workflow step and the state of the workflow using an active-active replication database.

10. The apparatus of claim 7, wherein the circuitry is further configured to store at the respective node a workflow data structure comprising the status of the workflow and a workflow step data structure comprising the status of the workflow step.

11. The apparatus of claim 10, wherein the circuitry configured to store at the respective node the workflow data structure comprises circuitry configured to store at the respective node a workflow data structure further comprising at least one of uniform resource identifier (URI) ID field, a name of the workflow field, a string task ID field and a Boolean completed field, and wherein the circuitry configured to store the workflow step data structure comprises circuitry configured to store a workflow step data structure further comprising at least one of a URI ID field; URI workflow ID field; URI dependency field; a string execution method field; a date start time field or a date end time field.

12. The apparatus of claim 7, wherein the circuitry is further configured to replicate the workflow data structure and replicate the workflow step data structure to the other nodes using the database replication.

13. An article comprising:
a non-transitory computer-readable medium that stores computer-executable instructions, the instructions causing a machine to:
distribute a workflow over a plurality of nodes in a workflow coordination system, each node being in operable communication with a processor and a memory that are configured to enable the node to perform its respective portion of the workflow;
determine, at each respective node, if a workflow step has an unsatisfied dependency;
set, at the respective node, a state of the workflow step to a blocked state if the workflow step has an unsatisfied dependency;
execute the workflow step at the respective node if the workflow step does not have an unsatisfied dependency;
set, at the respective node, the state of the workflow step to a cancelled state if, after executing the workflow step, the workflow step is cancelled;
set, at the respective node, the state of the workflow step to a success state if, after executing the workflow step, the workflow step is executed successfully;

set, at the respective node, the state of the workflow step to an error state if, after executing the workflow step, the workflow step is executed unsuccessfully;
set, at the respective node, a state of a workflow to a success state if the workflow is executed successfully; and
notify the other respective nodes of the state of the workflow step and the state of the workflow, each time the workflow step state is set and each time the workflow state is set, using a database replication configured to update the other nodes as to the state of the workflow step and the state of the workflow, to enable each respective node to share workflow metadata and workflow status;

wherein the state of the workflow step is deemed to be successful in the database replication if a majority of the plurality of respective nodes execute the workflow step successfully, and wherein availability of the workflow coordination system is not affected by a failure of a minority of the plurality of respective nodes to execute the workflow step successfully.

14. The article of claim 13, further comprising instructions causing the machine to select the workflow having the state set to create status.

15. The article of claim 13, wherein the instructions causing the machine to notify the other respective nodes of the state of the workflow step and the state of the workflow using the replication database comprises instructions causing the machine to notify the other respective nodes of the state of the workflow step and the state of the workflow using an active-active replication database.

16. The article of claim 13, further comprising instructions causing the machine to store at the respective node a workflow data structure comprising the status of the workflow and a workflow step data structure comprising the status of the workflow step.

17. The article of claim 16, wherein the instructions causing the machine to store at the node the workflow data structure comprises instructions causing the machine to store at the respective node a workflow data structure further comprising at least one of uniform resource identifier (URI) ID field, a name of the workflow field, a string task ID field and a Boolean completed field, and wherein the instructions causing the machine to store the workflow step data structure comprises instructions causing the machine to store a workflow step data structure further comprising at least one of a URI ID field; URI workflow ID field; URI dependency field; a string execution method field; a date start time field or a date end time field.

18. The article of claim 13, further comprising:
instructions causing the machine to provide a workflow data structure and workflow data step data structure to a respective one of the plurality of nodes; and
instructions causing the machine to replicate the workflow data structure and replicate the workflow step data structure to the other respective nodes using the database replication.

19. The method of claim 1, wherein the database replication comprises an active-active replicated database replication configured to enable the plurality of respective nodes to share workflow metadata and workflow status.

20. The method of claim 19, wherein each respective node comprises a respective copy of the active-active replicated database, such that the active-active replicated database is functional if a majority of the plurality of nodes are functional.

* * * * *